(12) United States Patent
Huang et al.

(10) Patent No.: US 11,943,805 B2
(45) Date of Patent: Mar. 26, 2024

(54) BETA OFFSET FACTOR CONFIGURATION FOR UPLINK CONTROL INFORMATION MULTIPLEXING ON A PHYSICAL UPLINK SHARED CHANNEL

(71) Applicant: QUALCOMM Incorporated, San Diego, CA (US)

(72) Inventors: Yi Huang, San Diego, CA (US); Wei Yang, San Diego, CA (US); Wanshi Chen, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 305 days.

(21) Appl. No.: 17/447,458

(22) Filed: Sep. 13, 2021

(65) Prior Publication Data
US 2022/0095323 A1    Mar. 24, 2022

Related U.S. Application Data

(60) Provisional application No. 62/706,935, filed on Sep. 18, 2020.

(51) Int. Cl.
*H04W 72/566* (2023.01)
*H04W 72/1268* (2023.01)
(Continued)

(52) U.S. Cl.
CPC ..... *H04W 72/569* (2023.01); *H04W 72/1268* (2013.01); *H04W 72/21* (2023.01); *H04W 72/23* (2023.01)

(58) Field of Classification Search
CPC ... H04W 72/569; H04W 72/21; H04W 72/23; H04W 72/1268
See application file for complete search history.

(56) References Cited

U.S. PATENT DOCUMENTS

2014/0056273 A1* 2/2014 Jang .................. H04L 1/0026
                                                        370/329
2020/0296716 A1* 9/2020 Lin .................... H04W 72/21
(Continued)

FOREIGN PATENT DOCUMENTS

WO   WO-2019195429 A1   10/2019
WO   WO-2020168223 A1    8/2020

OTHER PUBLICATIONS

R1-1908931 Asia Pacific Telecom "UCI enhancements for NR URLLC" 3GPP WG1 #98 Prague Aug. 26-30, 2019 (Year: 2019).*
(Continued)

*Primary Examiner* — Basil Ma
(74) *Attorney, Agent, or Firm* — Harrity & Harrity, LLP

(57) ABSTRACT

Various aspects of the present disclosure generally relate to wireless communication. In some aspects, a user equipment (UE) may select a set (represented in a table), from among a plurality of sets (tables) that include beta offset factors associated with multiplexing uplink control information (UCI) with data on a physical uplink shared channel (PUSCH), based at least in part on a priority level of the UCI and a priority level of the data on the PUSCH. The UE may select a beta offset factor from the selected set according to a type of the UCI. The UE may multiplex the UCI with the data in an uplink communication on the PUSCH based at least in part on the selected beta offset factor. The UE may transmit the uplink communication. Numerous other aspects are provided.

30 Claims, 11 Drawing Sheets

(51) Int. Cl.
  *H04W 72/21*   (2023.01)
  *H04W 72/23*   (2023.01)

(56) References Cited

U.S. PATENT DOCUMENTS

| | | | | |
|---|---|---|---|---|
| 2020/0344752 | A1* | 10/2020 | Li | H04B 7/0626 |
| 2020/0374917 | A1* | 11/2020 | Takeda | H04L 5/0053 |
| 2021/0321394 | A1* | 10/2021 | Li | H04L 1/007 |
| 2022/0217760 | A1* | 7/2022 | Iyer | H04L 5/0053 |
| 2023/0171044 | A1* | 6/2023 | Yang | H04L 5/0094 370/329 |

OTHER PUBLICATIONS

R1-2007055 Oppo "Summary #1 on Intra-UE multiplexing/prioritization for R17" 3GPP WG1 #102-e Aug. 17-28, 2020 (Year: 2020).*

Asia Pacific Telecom: "UCI Enhancements for NR URLLC", 3GPP Draft, R1-1908931, 3GPP TSG-RAN WG1 Meeting #98, UCI Enhancements for NR URLLC, 3rd Generation Partnership Project (3GPP), Mobile Competence Centre, 650, Route Des Lucioles, F-06921 Sophia-Antipolis Cedex, France, vol. RAN WG1, No. Prague, Czech Republic, Aug. 26, 2019-Aug. 30, 2019, Aug. 16, 2019 (Aug. 16, 2019), XP051765538, 3 Pages, Retrieved from the Internet: URL:http://www.3gpp.org/ftp/tsg_ran/WG1_RL1/TSGR1_98/Docs/R1-1908931.zip [retrieved on Aug. 16, 2019] Sect. 2.2.
International Search Report and Written Opinion—PCT/US2021/071441—ISA/EPO—dated Jan. 14, 2022.
OPPO: "Summary#2 on UCI Enhancements for URLLC", 3GPP Draft, R1-1907777, 3GPP TSG RAN WG1 #97, 3rd Generation Partnership Project (3GPP), Mobile Competence Centre, 650, Route Des Lucioles, F-06921 Sophia-Antipolis Cedex, France, vol. RAN WG1, No. Reno, USA, May 13, 2019-May 17, 2019, May 17, 2019 (May 17, 2019), pp. 1-20, XP051740050, 20 Pages, Retrieved from the Internet: URL:http://www.3gpp.org/ftp/tsg%5Fran/WG1%5FRL1/TSGR1%5F97/Docs/R1%2D1907777%2Ezip [retrieved on May 17, 2019] Sect. 4.2 Fujitsu and ETRI proposals.

* cited by examiner

| Beta_offset for HARQ-ACK (<=2 bits) | Beta_offset for HARQ-ACK (3-11 bits) | Beta_offset for HARQ-ACK (>11 bits) | Beta_offset for CSI part 1 (<=11 bits) | Beta_offset for CSI part 1 (>11 bits) | Beta_offset for CSI part 2 (<=11 bits) | Beta_offset for CSI part 2 (>11 bits) |
|---|---|---|---|---|---|---|
| A | B | C | D | E | F | G |

| Beta_off set index | Beta_offset for HARQ-ACK (<=2 bits) | Beta_offset for HARQ-ACK (3-11 bits) | Beta_offset for HARQ-ACK (>11 bits) | Beta_offset for CSI part 1 (<=11 bits) | Beta_offset for CSI part 1 (>11 bits) | Beta_offset for CSI part 2 (<=11 bits) | Beta_offset for CSI part 2 (>11 bits) |
|---|---|---|---|---|---|---|---|
| | | | | | | | |

Table 1: beta_offset in UCI on PUSCH for low priority UCI on low priority PUSCH

| Beta_off set index | Beta_offset for HARQ-ACK (<=2 bits) | Beta_offset for HARQ-ACK (3-11 bits) | Beta_offset for HARQ-ACK (>11 bits) | Beta_offset for CSI part 1 (<=11 bits) | Beta_offset for CSI part 1 (>11 bits) | Beta_offset for CSI part 2 (<=11 bits) | Beta_offset for CSI part 2 (>11 bits) |
|---|---|---|---|---|---|---|---|
| | | | | | | | |

Table 2: beta_offset in UCI on PUSCH for low priority UCI on high priority PUSCH

| Beta_off set index | Beta_offset for HARQ-ACK (<=2 bits) | Beta_offset for HARQ-ACK (3-11 bits) | Beta_offset for HARQ-ACK (>11 bits) | Beta_offset for CSI part 1 (<=11 bits) | Beta_offset for CSI part 1 (>11 bits) | Beta_offset for CSI part 2 (<=11 bits) | Beta_offset for CSI part 2 (>11 bits) |
|---|---|---|---|---|---|---|---|
| | | | | | | | |

Table 3: beta_offset in UCI on PUSCH for high priority UCI on low priority PUSCH

| Beta_off set index | Beta_offset for HARQ-ACK (<=2 bits) | Beta_offset for HARQ-ACK (3-11 bits) | Beta_offset for HARQ-ACK (>11 bits) | Beta_offset for CSI part 1 (<=11 bits) | Beta_offset for CSI part 1 (>11 bits) | Beta_offset for CSI part 2 (<=11 bits) | Beta_offset for CSI part 2 (>11 bits) |
|---|---|---|---|---|---|---|---|
| | | | | | | | |

Table 4: beta_offset in UCI on PUSCH for high priority UCI on high priority PUSCH

Table 1: beta_offset in UCI on PUSCH for same priority UCI and PUSCH

| Beta_off set index | Beta_offset for HARQ-ACK (<=2 bits) | Beta_offset for HARQ-ACK (3-11 bits) | Beta_offset for HARQ-ACK (>11 bits) | Beta_offset for CSI part 1 (<=11 bits) | Beta_offset for CSI part 1 (>11 bits) | Beta_offset for CSI part 2 (<=11 bits) | Beta_offset for CSI part 2 (>11 bits) |
|---|---|---|---|---|---|---|---|
| | | | | | | | |
| | | | | | | | |

Table 2: beta_offset in UCI on PUSCH for low priority UCI on high priority PUSCH

| Beta_off set index | Beta_offset for HARQ-ACK (<=2 bits) | Beta_offset for HARQ-ACK (3-11 bits) | Beta_offset for HARQ-ACK (>11 bits) | Beta_offset for CSI part 1 (<=11 bits) | Beta_offset for CSI part 1 (>11 bits) | Beta_offset for CSI part 2 (<=11 bits) | Beta_offset for CSI part 2 (>11 bits) |
|---|---|---|---|---|---|---|---|
| | | | | | | | |
| | | | | | | | |

Table 3: beta_offset in UCI on PUSCH for high priority UCI on low priority PUSCH

| Beta_off set index | Beta_offset for HARQ-ACK (<=2 bits) | Beta_offset for HARQ-ACK (3-11 bits) | Beta_offset for HARQ-ACK (>11 bits) | Beta_offset for CSI part 1 (<=11 bits) | Beta_offset for CSI part 1 (>11 bits) | Beta_offset for CSI part 2 (<=11 bits) | Beta_offset for CSI part 2 (>11 bits) |
|---|---|---|---|---|---|---|---|
| | | | | | | | |
| | | | | | | | |

FIG. 7

BETA OFFSET FACTOR CONFIGURATION FOR UPLINK CONTROL INFORMATION MULTIPLEXING ON A PHYSICAL UPLINK SHARED CHANNEL

CROSS-REFERENCE TO RELATED APPLICATION

This patent application claims priority to U.S. Provisional Patent Application No. 62/706,935, filed on Sep. 18, 2020, entitled "BETA OFFSET FACTOR CONFIGURATION FOR UPLINK CONTROL INFORMATION MULTIPLEXING ON PHYSICAL UPLINK SHARED CHANNEL," and assigned to the assignee hereof. The disclosure of the prior application is considered part of and is incorporated by reference into this patent application.

FIELD OF THE DISCLOSURE

Aspects of the present disclosure generally relate to wireless communication and to techniques and apparatuses for beta offset factor configuration for uplink control information multiplexing on a physical uplink shared channel.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink" or "forward link" refers to the communication link from the BS to the UE, and "uplink" or "reverse link" refers to the communication link from the UE to the BS. As will be described in more detail herein, a BS may be referred to as a Node B, a gNB, an access point (AP), a radio head, a transmit receive point (TRP), a New Radio (NR) BS, or a 5G Node B.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE, NR, and other radio access technologies.

SUMMARY

In some aspects, a method of wireless communication performed by a user equipment (UE) includes selecting a set (e.g., table), from among a plurality of sets (tables) that include beta offset factors associated with multiplexing uplink control information (UCI) with data on a physical uplink shared channel (PUSCH), based at least in part on a priority level of the UCI and a priority level of the data on the PUSCH. The method includes selecting a beta offset factor from the selected set according to a type of the UCI, multiplexing the UCI with the data in an uplink communication on the PUSCH based at least in part on the selected beta offset factor, and transmitting the uplink communication.

In some aspects, a method of wireless communication performed by a base station includes determining a plurality of sets with beta offset factors for multiplexing UCI with data on a PUSCH and transmitting configuration information associated with the plurality of sets to a UE such that the UE is configured to select, based at least in part on a priority level of the UCI and a priority level of the data on the PUSCH, a beta offset factor from the plurality of sets for multiplexing the UCI with the data in an uplink communication on the PUSCH. The method includes receiving the uplink communication with the UCI and the data multiplexed on the PUSCH, wherein the UCI and the data are multiplexed based at least in part on the selected beta offset factor.

In some aspects, a UE for wireless communication includes a memory and one or more processors coupled to the memory, the one or more processors configured to select a set, from among a plurality of sets that include beta offset factors associated with multiplexing UCI with data on a PUSCH, based at least in part on a priority level of the UCI and a priority level of the data on the PUSCH. The one or more processors are configured to select a beta offset factor from the selected set according to a type of the UCI, multiplex the UCI with the data in an uplink communication on the PUSCH based at least in part on the selected beta offset factor, and transmit the uplink communication.

In some aspects, a base station for wireless communication includes a memory and one or more processors coupled to the memory, the one or more processors configured to determine a plurality of sets with beta offset factors for multiplexing UCI with data on a PUSCH and transmit configuration information associated with the plurality of sets to a UE such that the UE is configured to select, based at least in part on a priority level of the UCI and a priority level of the data on the PUSCH, a beta offset factor from the plurality of sets for multiplexing the UCI with the data in an uplink communication on the PUSCH. The one or more processors are configured to receive the uplink communication with the UCI and the data multiplexed on the PUSCH, wherein the UCI and the data are multiplexed based at least in part on the selected beta offset factor.

In some aspects, a non-transitory computer-readable medium storing a set of instructions for wireless communication includes one or more instructions that, when executed by one or more processors of a UE, cause the UE to select a set, from among a plurality of sets that include beta offset factors associated with multiplexing UCI with data on a PUSCH, based at least in part on a priority level of the UCI and a priority level of the data on the PUSCH, select a beta offset factor from the selected set according to a type of the UCI, multiplex the UCI with the data in an uplink communication on the PUSCH based at least in part on the selected beta offset factor, and transmit the uplink communication.

In some aspects, a non-transitory computer-readable medium storing a set of instructions for wireless communication includes one or more instructions that, when executed by one or more processors of a base station, cause the base station to determine a plurality of sets with beta offset factors for multiplexing UCI with data on a PUSCH, transmit configuration information associated with the plurality of sets to a UE such that the UE is configured to select, based at least in part on a priority level of the UCI and a priority level of the data on the PUSCH, a beta offset factor from the plurality of sets for multiplexing the UCI with the data in an uplink communication on the PUSCH, and receive the uplink communication with the UCI and the data multiplexed on the PUSCH, wherein the UCI and the data are multiplexed based at least in part on the selected beta offset factor.

In some aspects, an apparatus for wireless communication includes means for selecting a set, from among a plurality of sets that include beta offset factors associated with multiplexing UCI with data on a PUSCH, based at least in part on a priority level of the UCI and a priority level of the data on the PUSCH, means for selecting a beta offset factor from the selected set according to a type of the UCI, means for multiplexing the UCI with the data in an uplink communication on the PUSCH based at least in part on the selected beta offset factor, and means for transmitting the uplink communication.

In some aspects, an apparatus for wireless communication includes means for determining a plurality of sets with beta offset factors for multiplexing UCI with data on a PUSCH, means for transmitting configuration information associated with the plurality of sets to a UE such that the UE is configured to select, based at least in part on a priority level of the UCI and a priority level of the data on the PUSCH, a beta offset factor from the plurality of sets for multiplexing the UCI with the data in an uplink communication on the PUSCH, and means for receiving the uplink communication with the UCI and the data multiplexed on the PUSCH, wherein the UCI and the data are multiplexed based at least in part on the selected beta offset factor.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 4 is a diagram illustrating an example of a beta offset factor table, in accordance with the present disclosure.

FIG. 5 is a diagram illustrating an example of beta offset factor tables for different priorities, in accordance with the present disclosure.

FIG. 7 is a diagram illustrating an example of beta offset factor tables, in accordance with the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
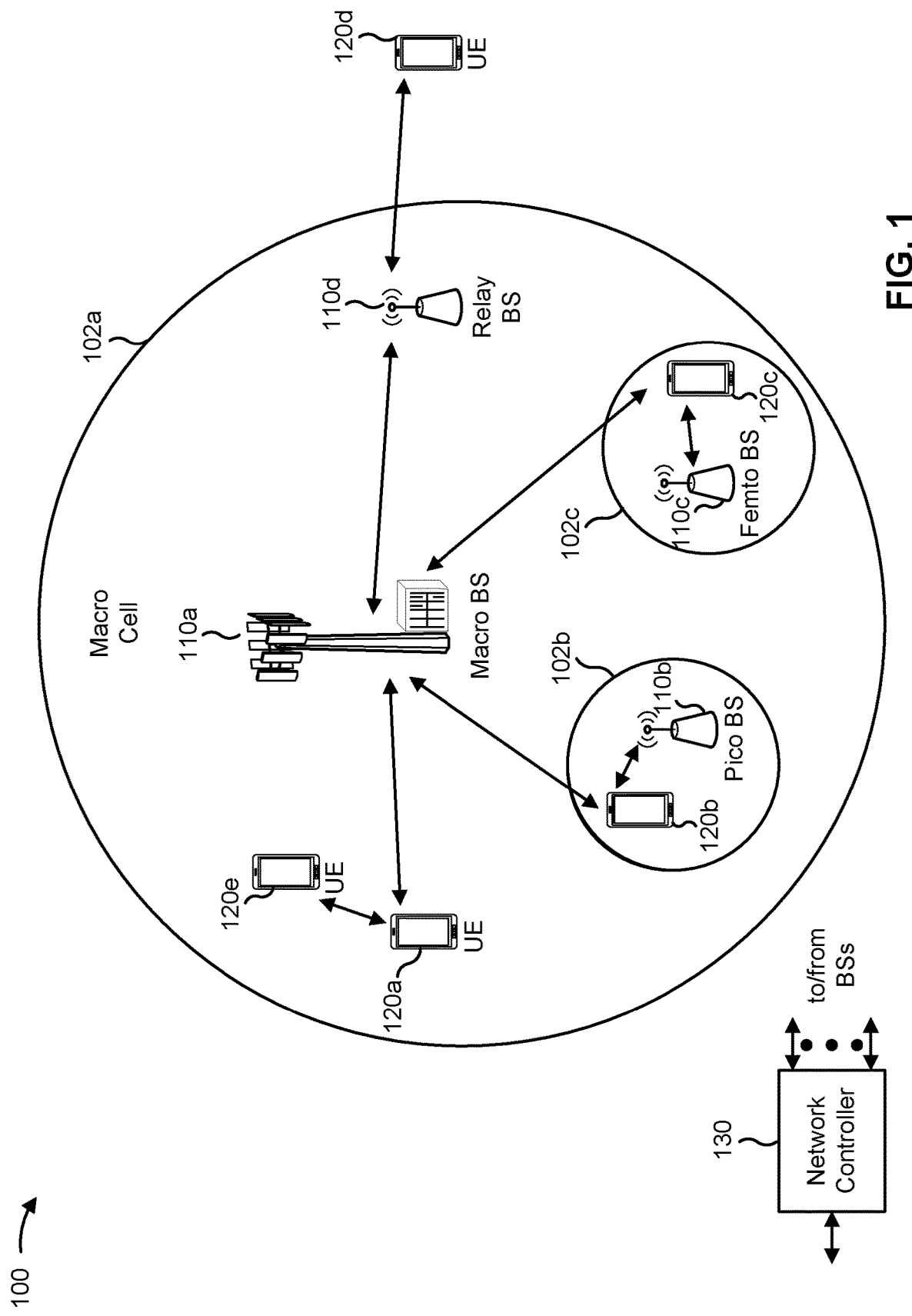
FIG. 1 is a diagram illustrating an example of a wireless network, in accordance with the present disclosure.

FIG. 1 is a diagram illustrating an example of a wireless network 100 in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, or a transmit receive point (TRP). Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, or a virtual network using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, or a relay.

Wireless network 100 may be a heterogeneous network that includes BSs of different types, such as macro BSs, pico BSs, femto BSs, and/or relay BSs. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, directly or indirectly, via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, and/or an air interface. A frequency may also be referred to as a carrier, and/or a frequency channel. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
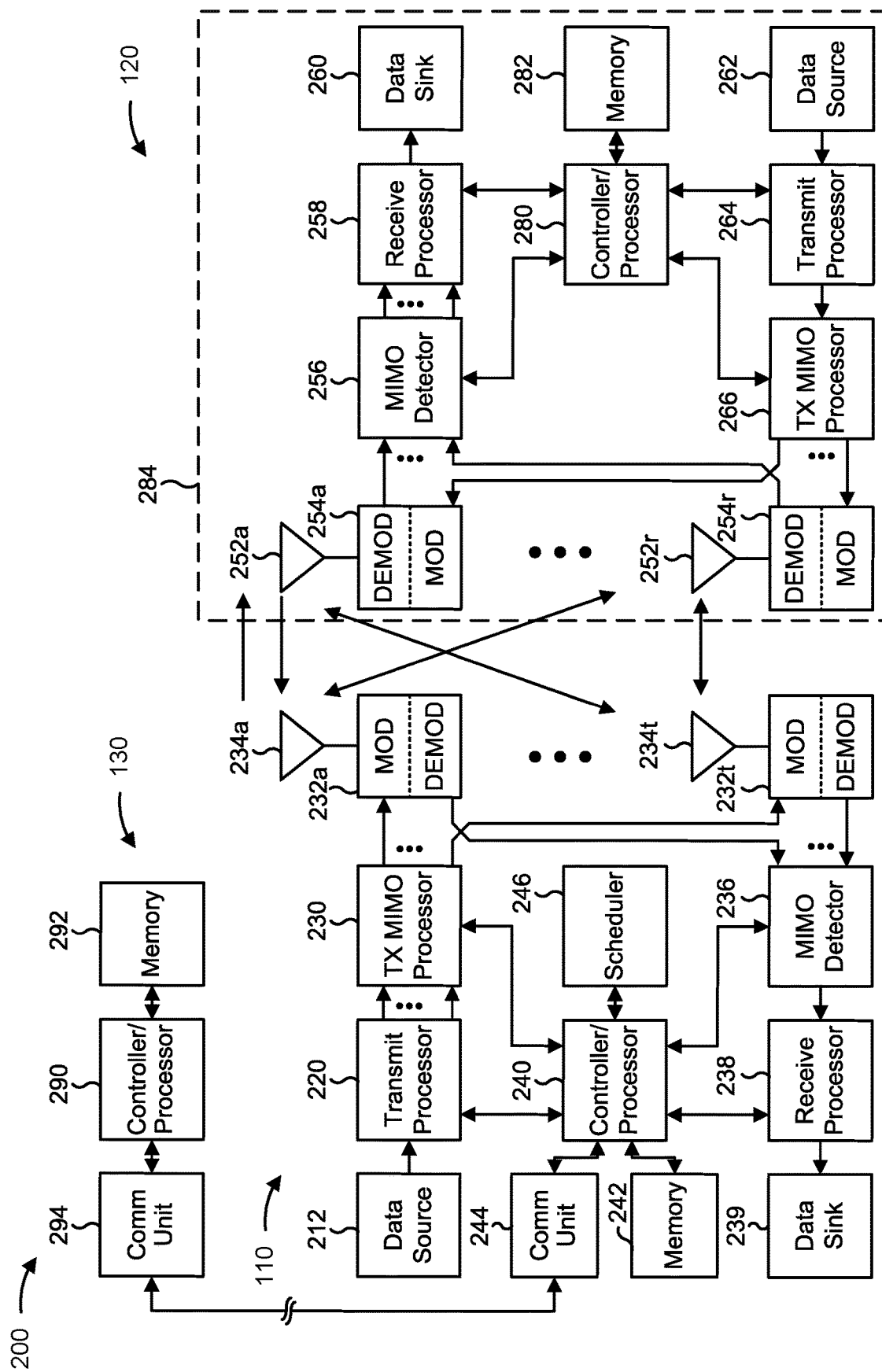
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T>1 and R>1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, upper layer signaling) and provide overhead symbols and control symbols. Transmit processor 220 may also generate reference symbols for reference signals (e.g., a cell-specific reference signal (CRS), a demodulation reference signal (DMRS)) and synchronization signals (e.g., the primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine reference signal received power (RSRP), received signal strength indicator (RSSI), reference signal received quality (RSRQ), and/or CQI, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein (for example, as described with reference to FIGS. 3-11).

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein (for example, as described with reference to FIGS. 3-11).

Controller/processor 240 of base station 110, controller/processor 280 of UE 120, and/or any other component(s) of FIG. 2 may perform one or more techniques associated with beta offset factor configuration for uplink control information (UCI) multiplexing on a physical uplink shared channel (PUSCH), as described in more detail elsewhere herein. For example, controller/processor 240 of base station 110, controller/processor 280 of UE 120, and/or any other component(s) of FIG. 2 may perform or direct operations of, for example, process 800 of FIG. 8, process 900 of FIG. 9, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of base station 110 and/or UE 120, may cause the one or more processors, UE 120, and/or base station 110 to perform or direct operations of, for example, process 800 of FIG. 8, process 900 of FIG. 9, and/or other processes as described herein. In some aspects, executing instructions may include running the instructions, converting the instructions, compiling the instructions, and/or interpreting the instructions, among other examples.

In some aspects, UE 120 includes means for selecting a set (e.g., table), from among a plurality of sets (tables) that include beta offset factors associated with multiplexing UCI with data on a PUSCH, based at least in part on a priority level of the UCI and a priority level of the data on the PUSCH, means for selecting a beta offset factor from the selected set according to a type of the UCI, means for multiplexing the UCI with the data in an uplink communication on the PUSCH based at least in part on the selected beta offset factor, and/or means for transmitting the uplink communication. The means for UE 120 to perform operations described herein may include, for example, antenna 252, demodulator 254, MIMO detector 256, receive processor 258, transmit processor 264, TX MIMO processor 266, modulator 254, controller/processor 280, and/or memory 282.

In some aspects, base station 110 includes means for determining a plurality of sets with beta offset factors for multiplexing UCI with data on a PUSCH, means for transmitting configuration information associated with the plurality of sets to a UE such that the UE is configured to select, based at least in part on a priority level of the UCI and a priority level of the data on the PUSCH, a beta offset factor from the plurality of sets for multiplexing the UCI with the data in an uplink communication on the PUSCH, and/or means for receiving the uplink communication with the UCI and the data multiplexed on the PUSCH, where the UCI and the data are multiplexed based at least in part on the selected beta offset factor. The means for base station 110 to perform operations described herein may include, for example, transmit processor 220, TX MIMO processor 230, modulator 232, antenna 234, demodulator 232, MIMO detector 236, receive processor 238, controller/processor 240, memory 242, and/or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
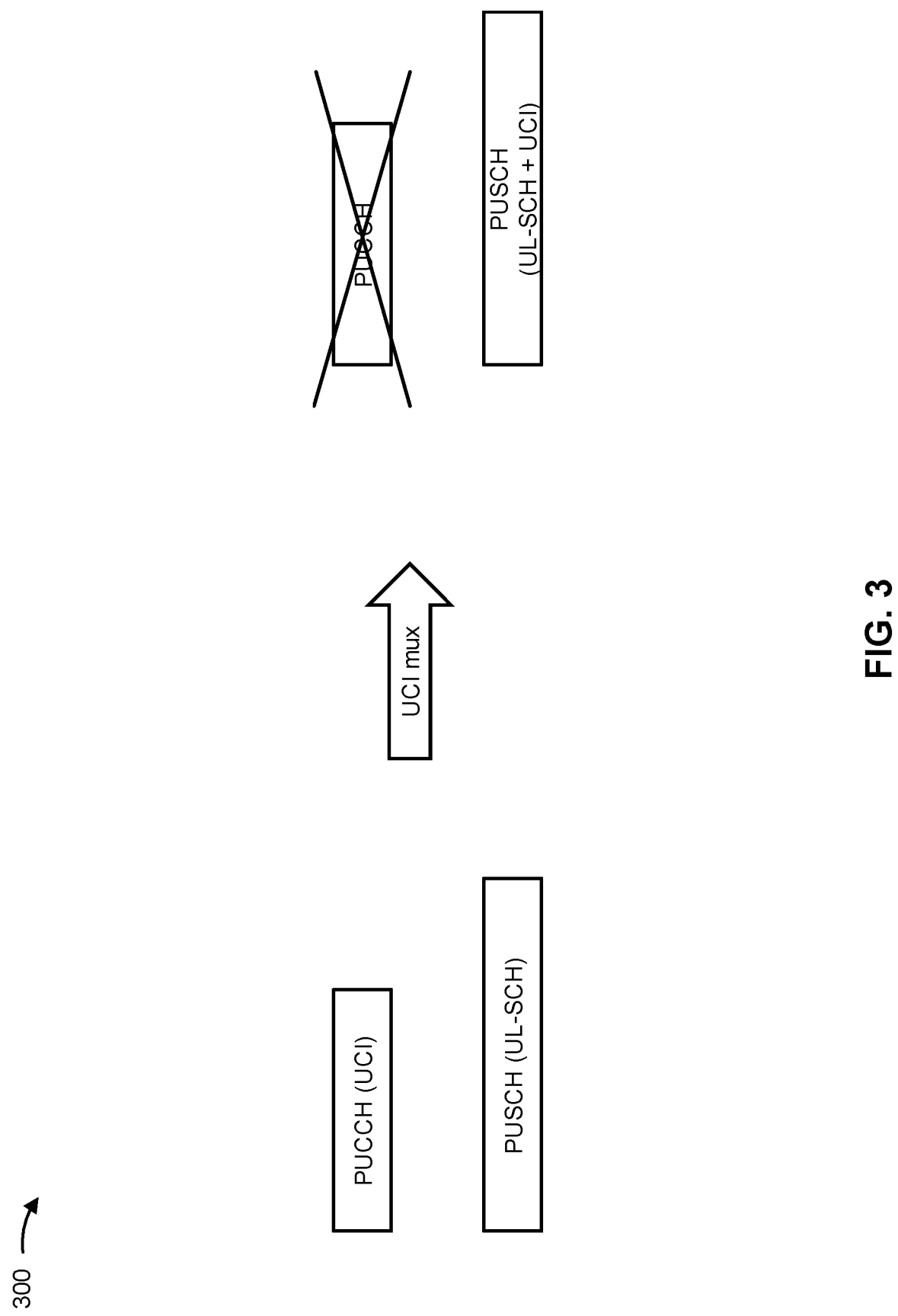
FIG. 3 is a diagram illustrating an example of uplink control information (UCI) multiplexing, in accordance with the present disclosure.

FIG. 3 is a diagram illustrating an example 300 of UCI multiplexing, in accordance with the present disclosure.

A UE may transmit UCI on a physical uplink control channel (PUCCH) to a base station. The base station may use feedback in the UCI, such as a hybrid automatic repeat request (HARD) acknowledgement (ACK), to configure and/or schedule communications for the UE. Example 300 shows UCI on the PUCCH and uplink shared data (UL-SCH) on the PUSCH. When a PUCCH overlaps in time with data to be transmitted on a PUSCH, the PUCCH transmission may be dropped, as shown by the PUCCH crossed out in example 300. However, the UCI that was to be carried on the PUCCH may be multiplexed with the data on the PUSCH, as shown in example 300. The UE may transmit the multiplexed UCI and data on the PUSCH.

Data on the PUSCH may have to share resource elements (REs) on the PUSCH with UCI, and thus the UCI may be provided some REs on the PUSCH according to a particular spectrum efficiency. "Spectrum efficiency" may refer to how many REs are allotted. The amount of UCI that is multiplexed with the data on the PUSCH may be too much or not enough, and a UE may increase or reduce a spectrum efficiency of the UCI when the UCI is multiplexed on the PUSCH. For example, the UE may increase a quantity of REs that are used for the UCI when the UCI is multiplexed with the data on the PUSCH, resulting in a higher reliability for the UCI but a greater impact on the data on the PUSCH. The quantity of REs for the UCI may be set according to a beta offset factor $\beta_{offset}^{PUSCH}$, which is shown in the following example equation:

$$Q'_{ACK} = \min \left\{ \left\lceil \frac{(O_{ACK} + L_{ACK}) \cdot \beta_{offset}^{PUSCH} \cdot \sum_{l=0}^{N_{symb,all}^{PUSCH}-1} M_{sc}^{UCI}(l)}{\sum_{r=0}^{C_{UL-SCH}-1} K_r} \right\rceil, \left\lceil \alpha \cdot \sum_{l=l_0}^{N_{symb,all}^{PUSCH}-1} M_{SC}^{UCI}(l) \right\rceil \right\}$$

In this example equation, $Q_{ACK}'$ represents a quantity of REs assigned to HARQ-ACK. $O_{ACK}$ represents a quantity of ACK bits, and $L_{ACK}$ represents cyclic redundancy check bits for ACK.

$$\sum_{l=0}^{N_{symb,all}^{PUSCH}-1} M_{sc}^{UCI}(l)$$

represents a total number of REs allocated for the PUSCH. $\Sigma_{r=0}^{C_{UL-SCH}-1} K_r$ represents a quantity of bits for the PUSCH. The a in the terms after the comma serves as a cap on the quantity of REs. In sum, the equation specifies a ratio of the quantity of bits for ACK over a total quantity of bits for the PUSCH, so as to determine how many REs are to be allocated for ACK. The larger the beta offset factor $\beta_{offset}^{PUSCH}$, the lower the spectrum efficiency of the UCI with respect to a spectrum efficiency of the data. That is, the larger the beta offset factor, the more REs that are used for UCI.

As indicated above, FIG. 3 is provided as an example. Other examples may differ from what is described with regard to FIG. 3.

FIG. 4 is a diagram illustrating an example 400 of a beta offset factor table, in accordance with the present disclosure.

A base station may configure a beta offset factor set for a UE via a radio resource control (RRC) message, and an example framework for such a set is shown by example 400. A beta offset factor set may include one or more beta offset factors for different quantities of bits for HARQ-ACK, for CSI part 1, and/or for CSI part 2. A beta offset factor set may be represented in a table. The table may apply to configured grant (CG) PUSCH or dynamic grant (DG) scheduled PUSCH. The table in FIG. 4 is an example that applies to CG PUSCH and lists an entry (represented by letters A through G) for each type of UCI, including HARQ-ACK that is 2 bits or less, HARQ-ACK that is from 3 bits to 11 bits, HARQ-ACK that is greater than 11 bits, channel state information (CSI) part 1 that is 11 bits or less, CSI part 1 that is greater than 11 bits, CSI part 2 that is 11 bits or less, and/or CSI part 2 that is greater than 11 bits. The entries for the beta offsets may be semi-static.

UCI and PUSCH may have different priorities, such that a priority for UCI may be higher or lower than a priority for data on the PUSCH. In some aspects, the UCI may specifically have a high priority or low priority, and the data on the PUSCH may have a high priority or low priority. Priority levels may be indicated by a value, such as a 0 (zero) or a 1 (one). However, there is currently one beta factor offset table that does not account for multiplexing with different priorities. If high priority communications are not multiplexed with sufficient REs, then important control information or data may be lost or delayed. Communications may degrade or experience additional latency. Retransmissions may be necessary and cause the UE to waste power, processing resources, and signaling resources.

As indicated above, FIG. 4 is provided as an example. Other examples may differ from what is described with regard to FIG. 4.

FIG. 5 is a diagram illustrating an example 500 of beta offset factor tables for different priorities, in accordance with the present disclosure.

According to various aspects described herein, a base station (e.g., gNB) may configure a UE with multiple beta offset factor sets (which may be represented in tables) to be used for different combinations of priorities. In this way, an appropriate beta offset factor may be chosen such that a quantity of REs may be allocated to a UCI that is consistent with a priority of the UCI with respect to a priority of the data on the PUSCH. The UE may avoid degraded communications, reduce latency, and conserve power, processing resources, and signaling resources that would otherwise be consumed by late or retransmitted high priority communications that should have been allocated more REs.

The multiple beta offset sets (tables) configured at the UE may include Table 1, shown in FIG. 5, which the UE may select based at least in part on the priority level of the UCI being low and the priority level of the data on the PUSCH being low. Table 2 shows a table to be selected based at least in part on the priority level of the UCI being low and the priority level of the data on the PUSCH being high. Table 3 shows a table to be selected based at least in part on the priority level of the UCI being high and the priority level of the data on the PUSCH being low. Table 4 shows a table to be selected based at least in part on the priority level of the UCI being high and the priority level of the data on the PUSCH being high. The tables may each include entries for beta offset factors as appropriate for the priorities of the table.

As indicated above, FIG. 5 is provided as an example. Other examples may differ from what is described with regard to FIG. 5.

Figure 6:
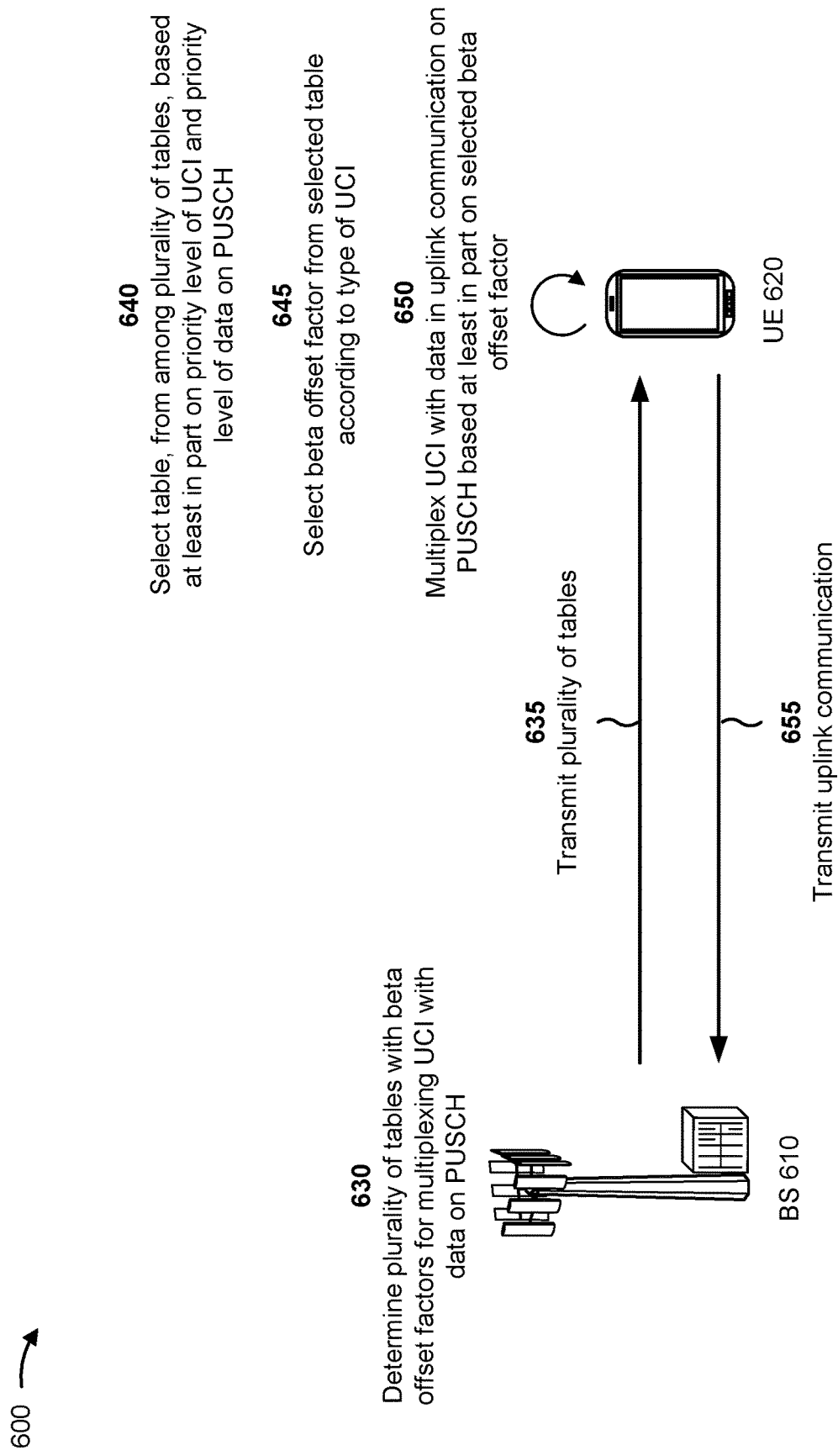
FIG. 6 is a diagram illustrating an example of beta offset factor configuration for UCI multiplexing on a physical uplink shared channel (PUSCH), in accordance with the present disclosure.

FIG. 6 is a diagram illustrating an example 600 of beta offset factor configuration for UCI multiplexing on a PUSCH, in accordance with the present disclosure. As shown in FIG. 6, example 600 includes communication between BS 610 (e.g., a BS 110 depicted in FIGS. 1 and 2) and a UE 620 (e.g., a UE 120 depicted in FIGS. 1 and 2). In some aspects, BS 610 and UE 620 may be included in a wireless network, such as wireless network 100. BS 610 and UE 620 may communicate on a wireless access link, which may include an uplink and a downlink.

As shown by reference number 630, BS 610 may determine a plurality of beta offset factor sets (tables) for multiplexing UCI with data on a PUSCH. The tables may include a table to be selected based on different combinations of priorities for UCI and for data on the PUSCH, as described in connection with FIG. 5. As shown by reference number 635, BS 610 may transmit configuration information associated with the tables to UE 620. For example, BS 610 may transmit the tables or information indicating the tables to UE 620. In some aspects, UE 620 may have the tables based at least in part on stored configuration information, and the information from BS 610 may indicate the tables to be used.

UE 620 may be configured with a certain level of priority for UCI and for data on the PUSCH. In some aspects, UE 620 may be configured for CG PUSCH, and the priority level of the UCI and/or the priority level of the data on the PUSCH may be configured by an RRC message. In some aspects, UE 620 may be configured for DG for HARQ-ACK multiplexed on CG PUSCH, and the priority level of the UCI (e.g., HARQ-ACK) may be configured by downlink control information (DCI) and the priority level of the data on the PUSCH may be configured by an RRC message. In some aspects, UE 620 may be configured for persistent channel state information (P-CSI) feedback, and the priority level of the UCI and/or the priority level of the data on the PUSCH may be configured by an RRC message.

As shown by reference number 640, UE 620 may select a set (table), from among a plurality of beta offset factor sets (tables), based at least in part on the priority level of the UCI and the priority level of the data on the PUSCH. For example, if the priority level of the UCI is low and the priority level of the data on the PUSCH is high, UE 620 may select a table such as Table 2 shown in FIG. 5.

As shown by reference number 645, UE 620 may select a beta offset factor from the selected set (table). The selection may be according to a type of UCI. For example, if Table 2 of FIG. 5 is selected and if the UCI is a HARQ-ACK greater than 11 bits, UE 620 may select a beta offset factor that is an entry in column 4 of Table 2.

As shown by reference number 650, UE 620 may multiplex the UCI with the data on the PUSCH in an uplink communication on the PUSCH based at least in part on the selected beta offset factor. As shown by reference number 655, UE 620 may transmit the uplink communication to BS 610. BS 610 may demultiplex the uplink communication received on the PUSCH to obtain the UCI (e.g., HARQ-ACK) on one or more REs in the uplink communication and the data on other REs of the uplink communication. To continue with the example using Table 2, the uplink communication may include, for example, mostly data REs and only one or two UCI REs, because the UCI is low priority, and the data is high priority. More high priority data may be received by BS 610 using the selected beta offset factor from Table 2 by using a beta offset factor that is blind to the UCI and data priorities.

As indicated above, FIG. 6 is provided as an example. Other examples may differ from what is described with regard to FIG. 6.

FIG. 7 is a diagram illustrating an example 700 of beta offset factor tables, in accordance with the present disclosure.

FIG. 7 shows multiple tables of beta offset factors, including Table 2 and Table 3 that were also shown in FIG. 5. However, in some aspects, Table 1 and Table 4 of FIG. 5 may be merged into a single table, shown as Table 1 in FIG. 7, for when the priority level of the UCI and the priority level of the data on the PUSCH are the same. Other tables may be configured for other combinations of priorities, including for priorities beyond "low" and "high."

As indicated above, FIG. 7 is provided as an example. Other examples may differ from what is described with regard to FIG. 7.

Figure 8:
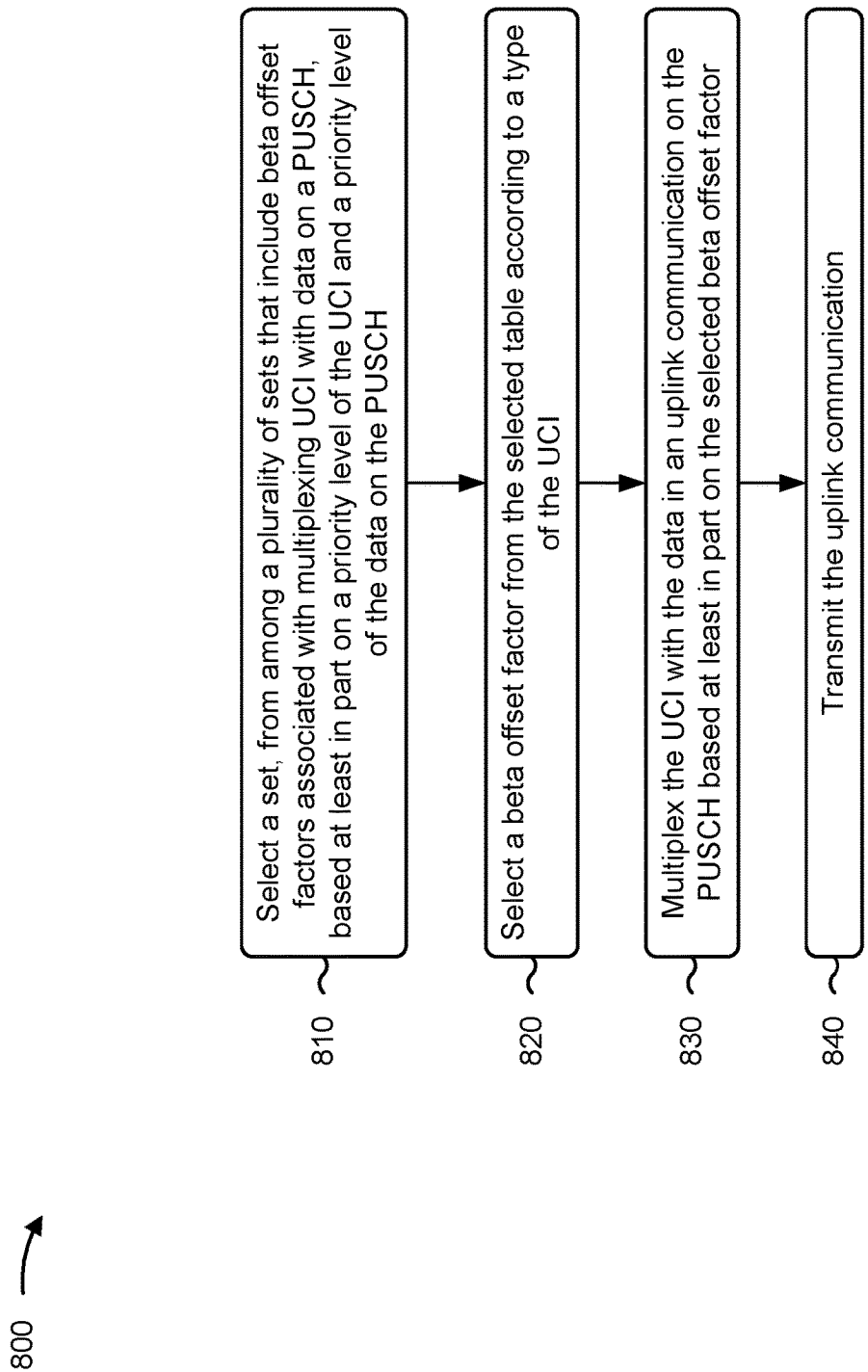
FIG. 8 is a diagram illustrating an example process performed, for example, by a UE, in accordance with the present disclosure.

FIG. 8 is a diagram illustrating an example process 800 performed, for example, by a UE, in accordance with the present disclosure. Example process 800 is an example where the UE (e.g., UE 120 depicted in FIGS. 1-2, UE 620 depicted in FIG. 6) performs operations associated with beta offset factor configuration for UCI multiplexing on a PUSCH.

As shown in FIG. 8, in some aspects, process 800 may include selecting a set, from among a plurality of sets that include beta offset factors associated with multiplexing UCI with data on a PUSCH, based at least in part on a priority level of the UCI and a priority level of the data on the PUSCH (block 810). For example, the UE (e.g., using selection component 1008 depicted in FIG. 10) may select a set, from among a plurality of sets that include beta offset factors associated with multiplexing UCI with data on a PUSCH, based at least in part on a priority level of the UCI and a priority level of the data on the PUSCH, as described above.

As further shown in FIG. 8, in some aspects, process 800 may include selecting a beta offset factor from the selected set according to a type of the UCI (block 820). For example, the UE (e.g., using selection component 1008 depicted in FIG. 10) may select a beta offset factor from the selected set according to a type of the UCI, as described above.

As further shown in FIG. 8, in some aspects, process 800 may include multiplexing the UCI with the data in an uplink communication on the PUSCH based at least in part on the selected beta offset factor (block 830). For example, the UE (e.g., using multiplexer component 1010 depicted in FIG. 10) may multiplex the UCI with the data in an uplink communication on the PUSCH based at least in part on the selected beta offset factor, as described above.

As further shown in FIG. 8, in some aspects, process 800 may include transmitting the uplink communication (block 840). For example, the UE (e.g., using transmission component 1004 depicted in FIG. 10) may transmit the uplink communication, as described above.

Process 800 may include additional aspects, such as any single aspect or any combination of aspects described below and/or in connection with one or more other processes described elsewhere herein.

In a first aspect, the plurality of sets includes a set to be selected based at least in part on the priority level of the UCI being low and the priority level of the data on the PUSCH being low, a set to be selected based at least in part on the priority level of the UCI being low and the priority level of the data on the PUSCH being high, a set to be selected based at least in part on the priority level of the UCI being high and the priority level of the data on the PUSCH being low, and a set to be selected based at least in part on the priority level of the UCI being high and the priority level of the data on the PUSCH being high.

In a second aspect, alone or in combination with the first aspect, the plurality of sets includes a set to be selected based at least in part on the priority level of the UCI and the priority level of the data on the PUSCH being the same, a set to be selected based at least in part on the priority level of the UCI being low and the priority level of the data on the PUSCH being high, and a set to be selected based at least in part on the priority level of the UCI being high and the priority level of the data on the PUSCH being low.

In a third aspect, alone or in combination with one or more of the first and second aspects, selecting the beta offset factor from the selected set according to the type of the UCI includes selecting the beta offset factor from among a plurality of types of UCI, the plurality of types of UCI including HARQ-ACK that is 2 bits or less, HARQ-ACK that is from 3 bits to 11 bits, HARQ-ACK that is greater than 11 bits, CSI part 1 that is 11 bits or less, CSI part 1 that is greater than 11 bits, CSI part 2 that is 11 bits or less, and CSI part 2 that is greater than 11 bits.

In a fourth aspect, alone or in combination with one or more of the first through third aspects, the UE is configured for CG PUSCH, and at least one of the priority level of the UCI or the priority level of the data on the PUSCH is configured by an RRC message.

In a fifth aspect, alone or in combination with one or more of the first through fourth aspects, the UE is configured for DG for HARQ-ACK multiplexed on CG PUSCH, and the priority level of the UCI is configured by DCI and the priority level of the data on the PUSCH is configured by an RRC message.

In a sixth aspect, alone or in combination with one or more of the first through fifth aspects, the UE is configured for P-CSI feedback, and at least one of the priority level of the UCI or the priority level of the data on the PUSCH is configured by an RRC message.

In a seventh aspect, alone or in combination with one or more of the first through sixth aspects, multiplexing the UCI with the data includes setting a spectrum efficiency of the UCI based at least in part on the beta offset factor.

In an eighth aspect, alone or in combination with one or more of the first through seventh aspects, setting the spectrum efficiency of the UCI based at least in part on the beta offset factor includes setting a quantity of resource elements that are to be used for the UCI when multiplexing the UCI with the data on the PUSCH.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
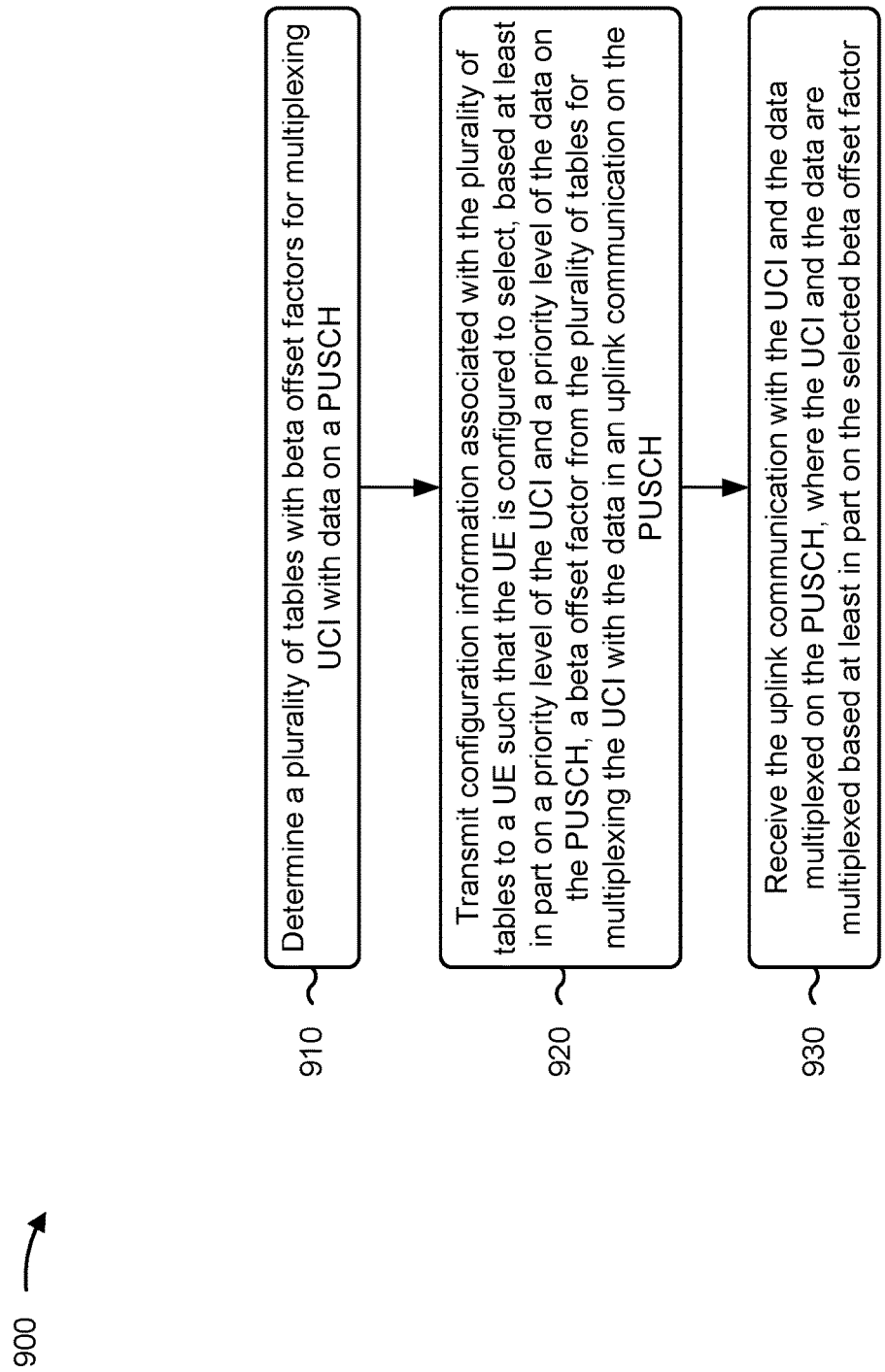
FIG. 9 is a diagram illustrating an example process performed, for example, by a base station, in accordance with the present disclosure.

FIG. 9 is a diagram illustrating an example process 900 performed, for example, by a base station, in accordance with the present disclosure. Example process 900 is an example where the base station (e.g., base station 110 depicted in FIGS. 1-2, BS 610 depicted in FIG. 6) performs operations associated with beta offset factor configuration for UCI multiplexing on a PUSCH.

As shown in FIG. 9, in some aspects, process 900 may include determining a plurality of sets with beta offset factors for multiplexing UCI with data on a PUSCH (block 910). For example, the base station (e.g., using determination component 1108 depicted in FIG. 11) may determine a plurality of sets with beta offset factors for multiplexing UCI with data on a PUSCH, as described above.

As further shown in FIG. 9, in some aspects, process 900 may include transmitting configuration information associated with the plurality of sets to a UE such that the UE is configured to select, based at least in part on a priority level of the UCI and a priority level of the data on the PUSCH, a beta offset factor from the plurality of sets for multiplexing the UCI with the data in an uplink communication on the PUSCH (block 920). For example, the base station (e.g., using transmission component 1104 depicted in FIG. 11) may transmit configuration information associated with the plurality of sets to a UE such that the UE is configured to select, based at least in part on a priority level of the UCI and a priority level of the data on the PUSCH, a beta offset factor from the plurality of sets for multiplexing the UCI with the data in an uplink communication on the PUSCH, as described above.

As further shown in FIG. 9, in some aspects, process 900 may include receiving the uplink communication with the UCI and the data multiplexed on the PUSCH (block 930). For example, the base station (e.g., using reception component 1102 depicted in FIG. 11) may receive the uplink communication with the UCI and the data multiplexed on the PUSCH, as described above. In some aspects, the UCI and the data are multiplexed based at least in part on the selected beta offset factor.

Process 900 may include additional aspects, such as any single aspect or any combination of aspects described below and/or in connection with one or more other processes described elsewhere herein.

In a first aspect, the plurality of sets includes a set to be selected based at least in part on the priority level of the UCI being low and the priority level of the data on the PUSCH being low, a set to be selected based at least in part on the priority level of the UCI being low and the priority level of the data on the PUSCH being high, a set to be selected at least in part on the priority level of the UCI being high and the priority level of the data on the PUSCH being low, and a set to be selected based at least in part on the priority level of the UCI being high and the priority level of the data on the PUSCH being high.

In a second aspect, alone or in combination with the first aspect, the plurality of sets includes a set to be selected based at least in part on the priority level of the UCI and the priority level of the data on the PUSCH being the same, a set to be selected based at least in part on the priority level of the UCI being low and the priority level of the data on the PUSCH being high, and a set to be selected based at least in part on the priority level of the UCI being high and the priority level of the data on the PUSCH being low.

In a third aspect, alone or in combination with one or more of the first and second aspects, each set of the plurality of sets includes beta offset factors for a plurality of types of UCI, the plurality of types of UCI including HARQ-ACK that is 2 bits or less, HARQ-ACK that is from 3 bits to 11 bits, HARQ-ACK that is greater than 11 bits, CSI part 1 that is 11 bits or less, CSI part 1 that is greater than 11 bits, CSI part 2 that is 11 bits or less, and CSI part 2 that is greater than 11 bits.

In a fourth aspect, alone or in combination with one or more of the first through third aspects, the UE is configured for CG PUSCH, and process 900 further comprises transmitting an RRC message that indicates at least one of the priority level of the UCI or the priority level of the data on the PUSCH.

In a fifth aspect, alone or in combination with one or more of the first through fourth aspects, the UE is configured for DG for HARQ-ACK multiplexed on CG PUSCH, and process 900 further comprises transmitting DCI that indicates the priority level of the UCI and transmitting an RRC message that indicates the priority level of the data on the PUSCH.

In a sixth aspect, alone or in combination with one or more of the first through fifth aspects, the UE is configured for P-CSI feedback, and process 900 further comprises transmitting an RRC message that indicates at least one of the priority level of the UCI or the priority level of the data on the PUSCH.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
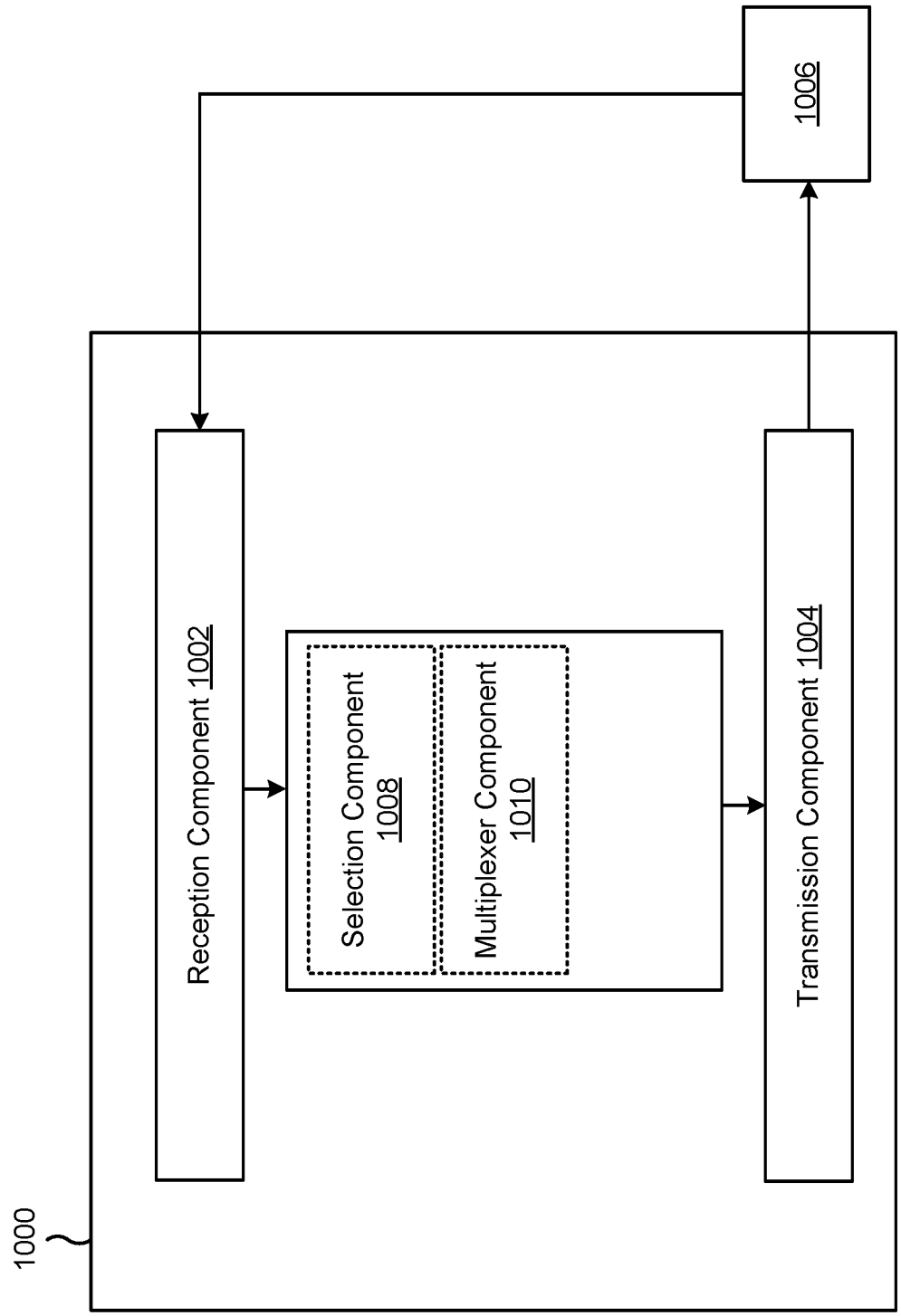
FIGS. 10-11 are block diagrams of example apparatuses for wireless communication, in accordance with the present disclosure.

FIG. 10 is a block diagram of an example apparatus 1000 for wireless communication. The apparatus 1000 may be a UE (e.g., UE 120, UE 620), or a UE may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as a UE, a base station, or another wireless communication device) using the reception component 1002 and the transmission component 1004. As further shown, the apparatus 1000 may include a selection component 1008 or a multiplexer component 1010, among other examples.

In some aspects, the apparatus 1000 may be configured to perform one or more operations described herein in connection with FIGS. 3-9. Additionally or alternatively, the apparatus 1000 may be configured to perform one or more processes described herein, such as process 800 of FIG. 8. In some aspects, the apparatus 1000 and/or one or more components shown in FIG. 10 may include one or more components of the UE described above in connection with FIG. 2. Additionally, or alternatively, one or more components shown in FIG. 10 may be implemented within one or more components described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and execuset by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1000. In some aspects, the reception component 1002 may include one or more antennas, a demodulator, a MIMO detector, a receive processor, a controller/processor, a memory, or a combination thereof, of the UE described above in connection with FIG. 2.

The transmission component 1004 may transmit communications, such as reference signals, control information, data communications, or a combination thereof, to the apparatus 1006. In some aspects, one or more other components of the apparatus 1000 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modulator, a transmit MIMO processor, a transmit processor, a controller/processor, a memory, or a combination thereof, of the UE described above in connection with FIG. 2. In some aspects, the transmission component 1004 may be co-located with the reception component 1002 in a transceiver.

The selection component 1008 may select a set, from among a plurality of sets that include beta offset factors associated with multiplexing UCI with data on a PUSCH, based at least in part on a priority level of the UCI and a priority level of the data on the PUSCH. In some aspects, the selection component 1008 may include a controller/processor, a memory, or a combination thereof, of the UE described above in connection with FIG. 2. The selection component 1008 may select a beta offset factor from the selected set according to a type of the UCI.

The multiplexer component 1010 may multiplex the UCI with the data in an uplink communication on the PUSCH based at least in part on the selected beta offset factor. In some aspects, the multiplexer component 1010 may include one or more antennas, a modulator, a transmit MIMO processor, a transmit processor, a controller/processor, a memory, or a combination thereof, of the UE described above in connection with FIG. 2. The transmission component 1004 may transmit the uplink communication.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally or alternatively, a set of (one or more) components shown in FIG. 10 may perform one or more functions described as being performed by another set of components shown in FIG. 10.

Figure 11:
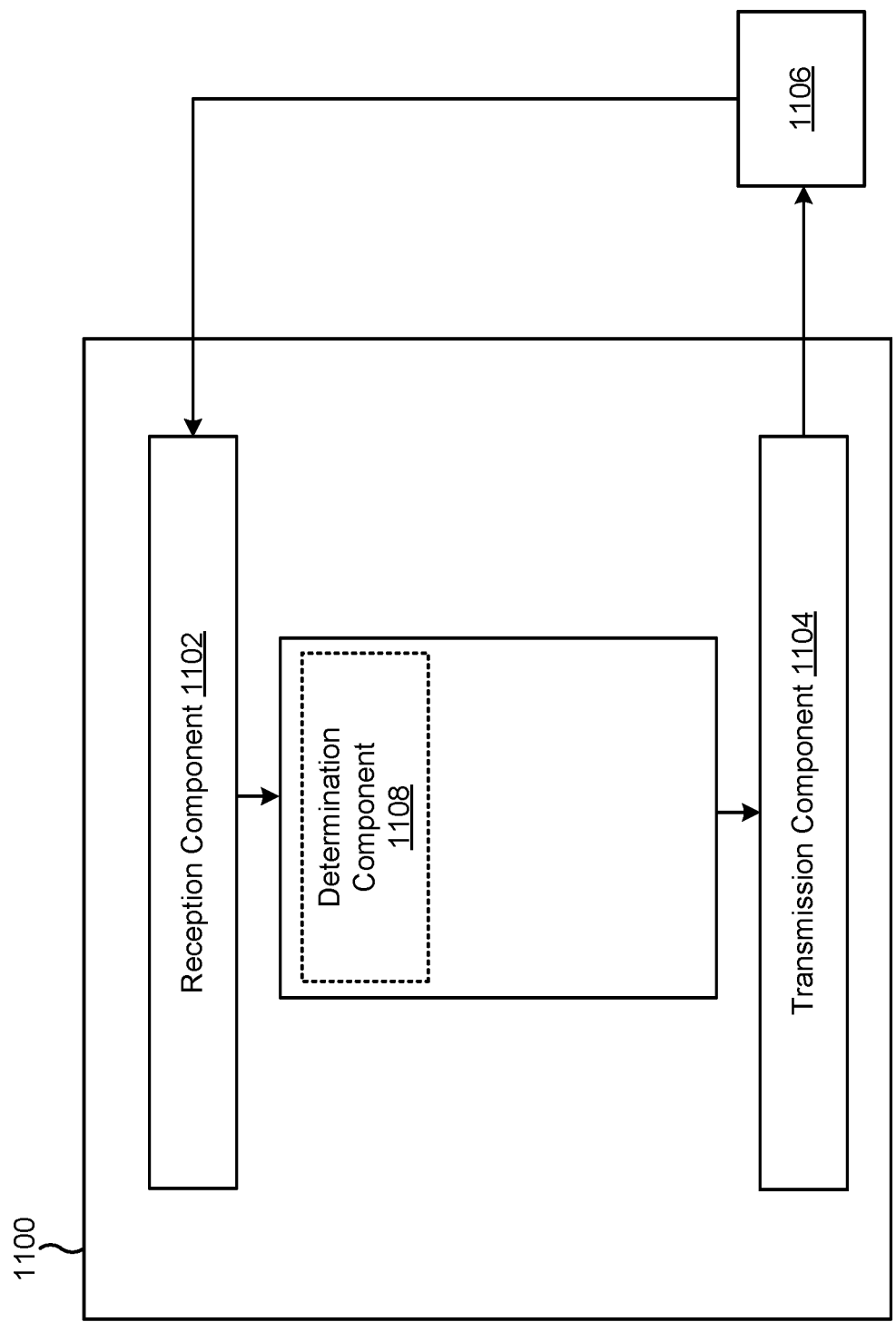

FIG. 11 is a block diagram of an example apparatus 1100 for wireless communication. The apparatus 1100 may be a base station (e.g., BS 110, BS 610), or a base station may include the apparatus 1100. In some aspects, the apparatus 1100 includes a reception component 1102 and a transmission component 1104, which may be in communication with one another (for example, via one or more buses and/or one or more other components). As shown, the apparatus 1100 may communicate with another apparatus 1106 (such as a UE, a base station, or another wireless communication device) using the reception component 1102 and the transmission component 1104. As further shown, the apparatus 1100 may include a determination component 1108, among other examples.

In some aspects, the apparatus 1100 may be configured to perform one or more operations described herein in connection with FIGS. 3-9. Additionally or alternatively, the apparatus 1100 may be configured to perform one or more processes described herein, such as process 900 of FIG. 9. In some aspects, the apparatus 1100 and/or one or more components shown in FIG. 11 may include one or more components of the base station described above in connection with FIG. 2. Additionally, or alternatively, one or more components shown in FIG. 11 may be implemented within one or more components described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1102 may receive communications, such as reference signals, control information, data communications, or a combination thereof, from the apparatus 1106. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1100. In some aspects, the reception component 1102 may include one or more antennas, a demodulator, a MIMO detector, a receive processor, a controller/processor, a memory, or a combination thereof, of the base station described above in connection with FIG. 2.

The transmission component 1104 may transmit communications, such as reference signals, control information, data communications, or a combination thereof, to the apparatus 1106. In some aspects, one or more other components of the apparatus 1100 may generate communications and may provide the generated communications to the transmission component 1104 for transmission to the apparatus 1106. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1106. In some aspects, the transmission component 1104 may include one or more antennas, a modulator, a transmit MIMO processor, a transmit processor, a controller/processor, a memory, or a combination thereof, of the base station described above in connection with FIG. 2. In some aspects, the transmission component 1104 may be co-located with the reception component 1102 in a transceiver.

The determination component 1108 may determine a plurality of sets with beta offset factors for multiplexing UCI with data on a PUSCH. In some aspects, the determination component 1108 may include a controller/processor, a memory, or a combination thereof, of the base station described above in connection with FIG. 2. The transmission component 1104 may transmit configuration information associated with the plurality of sets to a UE such that the UE is configured to select, based at least in part on a priority level of the UCI and a priority level of the data on the PUSCH, a beta offset factor from the plurality of sets for multiplexing the UCI with the data in an uplink communication on the PUSCH. The reception component 1102 may receive the uplink communication with the UCI and the data multiplexed on the PUSCH, where the UCI and the data are multiplexed based at least in part on the selected beta offset factor.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally or alternatively, a set of (one or more) components shown in FIG. 11 may perform one or more functions described as being performed by another set of components shown in FIG. 11.

The following provides an overview of some Aspects of the present disclosure:

Aspect 1: A method of wireless communication performed by a user equipment (UE), comprising: selecting a set (table), from among a plurality of sets (tables) that include beta offset factors associated with multiplexing uplink control information (UCI) with data on a physical uplink shared channel (PUSCH), based at least in part on a priority level of the UCI and a priority level of the data on the PUSCH; selecting a beta offset factor from the selected set (table) according to a type of the UCI; multiplexing the UCI with the data in an uplink communication on the PUSCH based at least in part on the selected beta offset factor; and transmitting the uplink communication.

Aspect 2: The method of Aspect 1, wherein the plurality of sets (tables) includes a set (table) to be selected based at least in part on the priority level of the UCI being low and the priority level of the data on the PUSCH being low, a set (table) to be selected based at least in part on the priority level of the UCI being low and the priority level of the data on the PUSCH being high, a set (table) to be selected based at least in part on the priority level of the UCI being high and the priority level of the data on the PUSCH being low, and a set (table) to be selected based at least in part on the priority level of the UCI being high and the priority level of the data on the PUSCH being high.

Aspect 3: The method of Aspect 1, wherein the plurality of sets (tables) includes a set (table) to be selected based at least in part on the priority level of the UCI and the priority level of the data on the PUSCH being the same, a set (table) to be selected based at least in part on the priority level of the UCI being low and the priority level of the data on the PUSCH being high, and a set (table) to be selected based at least in part on the priority level of the UCI being high and the priority level of the data on the PUSCH being low.

Aspect 4: The method of any of Aspects 1-3, wherein selecting the beta offset factor from the selected set according to the type of the UCI includes selecting the beta offset factor from among a plurality of types of UCI, the plurality of types of UCI including: hybrid automatic repeat request acknowledgement (HARQ-ACK) that is 2 bits or less, HARQ-ACK that is from 3 bits to 11 bits, HARQ-ACK that is greater than 11 bits, channel state information (CSI) part 1 that is 11 bits or less, CSI part 1 that is greater than 11 bits, CSI part 2 that is 11 bits or less, and CSI part 2 that is greater than 11 bits.

Aspect 5: The method of any of Aspects 1-4, wherein the UE is configured for configured grant PUSCH, and wherein at least one of the priority level of the UCI or the priority level of the data on the PUSCH is configured by a radio resource control message.

Aspect 6: The method of any of Aspects 1-5, wherein the UE is configured for dynamic grant for hybrid automatic repeat request acknowledgement (HARQ-ACK) multiplexed on configured grant PUSCH, and wherein the priority level of the UCI is configured by downlink control information and the priority level of the data on the PUSCH is configured by a radio resource control message.

Aspect 7: The method of any of Aspects 1-6, wherein the UE is configured for persistent channel state information (CSI) feedback, and wherein at least one of the priority level of the UCI or the priority level of the data on the PUSCH is configured by a radio resource control message.

Aspect 8: The method of any of Aspects 1-7, wherein multiplexing the UCI with the data includes setting a spectrum efficiency of the UCI based at least in part on the beta offset factor.

Aspect 9: The method of Aspect 8, wherein setting the spectrum efficiency of the UCI based at least in part on the beta offset factor includes setting a quantity of resource elements that are to be used for the UCI when multiplexing the UCI with the data on the PUSCH.

Aspect 10: A method of wireless communication performed by a base station, comprising: determining a plurality of sets (tables) with beta offset factors for multiplexing uplink control information (UCI) with data on a physical uplink shared channel (PUSCH); transmitting configuration information associated with the plurality of sets (tables) to a user equipment (UE) such that the UE is configured to select, based at least in part on a priority level of the UCI and a priority level of the data on the PUSCH, a beta offset factor from the plurality of sets (tables) for multiplexing the UCI with the data in an uplink communication on the PUSCH; and receiving the uplink communication with the UCI and the data multiplexed on the PUSCH, wherein the UCI and the data are multiplexed based at least in part on the selected beta offset factor.

Aspect 11: The method of Aspect 10, wherein the plurality of sets (tables) includes a set (table) to be selected based at least in part on the priority level of the UCI being low and the priority level of the data on the PUSCH being low, a set (table) to be selected based at least in part on the priority level of the UCI being low and the priority level of the data on the PUSCH being high, a set (table) to be selected based at least in part on the priority level of the UCI being high and the priority level of the data on the PUSCH being low, and a set (table) to be selected based at least in part on the priority level of the UCI being high and the priority level of the data on the PUSCH being high.

Aspect 12: The method of Aspect 10, wherein the plurality of sets (tables) includes a set (table) to be selected based at least in part on the priority level of the UCI and the priority level of the data on the PUSCH being the same, a set (table) to be selected based at least in part on the priority level of the UCI being low and the priority level of the data on the PUSCH being high, and a set (table) to be selected based at least in part on the priority level of the UCI being high and the priority level of the data on the PUSCH being low.

Aspect 13: The method of any of Aspects 10-12, wherein each set of the plurality of sets (tables) includes beta offset factors for a plurality of types of UCI, the plurality of types of UCI including: hybrid automatic repeat request acknowledgement (HARQ-ACK) that is 2 bits or less, HARQ-ACK that is from 3 bits to 11 bits, HARQ-ACK that is greater than 11 bits, channel state information (CSI) part 1 that is 11 bits or less, CSI part 1 that is greater than 11 bits, CSI part 2 that is 11 bits or less, and CSI part 2 that is greater than 11 bits.

Aspect 14: The method of any of Aspects 10-13, wherein the UE is configured for configured grant PUSCH, and wherein the method further comprises transmitting a radio resource control message that indicates at least one of the priority level of the UCI or the priority level of the data on the PUSCH.

Aspect 15: The method of any of Aspects 10-14, wherein the UE is configured for dynamic grant for hybrid automatic repeat request acknowledgement (HARQ-ACK) multiplexed on configured grant PUSCH, and wherein the method further comprises transmitting downlink control information that indicates the priority level of the UCI and transmitting a radio resource control message that indicates the priority level of the data on the PUSCH.

Aspect 16: The method of any of Aspects 10-15, wherein the UE is configured for persistent channel state information (CSI) feedback, and wherein the method further comprises transmitting a radio resource control message that indicates at least one of the priority level of the UCI or the priority level of the data on the PUSCH.

Aspect 17: An apparatus for wireless communication at a device, comprising a processor; memory coupled with the processor; and instructions stored in the memory and executable by the processor to cause the apparatus to perform the method of one or more of Aspects 1-16.

Aspect 18: A device for wireless communication, comprising a memory and one or more processors coupled to the memory, the one or more processors configured to perform the method of one or more of Aspects 1-16.

Aspect 19: An apparatus for wireless communication, comprising at least one means for performing the method of one or more of Aspects 1-16.

Aspect 20: A non-transitory computer-readable medium storing code for wireless communication, the code comprising instructions executable by a processor to perform the method of one or more of Aspects 1-16.

Aspect 21: A non-transitory computer-readable medium storing a set (table) of instructions for wireless communication, the set of instructions comprising one or more instructions that, when executed by one or more processors of a device, cause the device to perform the method of one or more of Aspects 1-16.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware, firmware, and/or a combination of hardware and software.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, a combination of related and unrelated items), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
    one or more memories; and
    one or more processors, coupled to the one or more memories, configured to:
        select a set of multiple beta offset factors from a plurality of sets of multiple beta offset factors associated with multiplexing uplink control information (UCI) with data on a physical uplink shared channel (PUSCH),
            wherein the set of multiple beta offset factors is selected from the plurality of sets of multiple beta offset factors using a priority level of the UCI and a priority level of the data on the PUSCH;
        select a beta offset factor from the selected set of multiple beta offset factors according to a type of the UCI;
        multiplex the UCI with the data in an uplink communication on the PUSCH based at least in part on the selected beta offset factor; and
        transmit the uplink communication.

2. The UE of claim 1, wherein the plurality of sets of multiple beta offset factors includes a set to be selected based at least in part on the priority level of the UCI being low and the priority level of the data on the PUSCH being low, a set to be selected based at least in part on the priority level of the UCI being low and the priority level of the data on the PUSCH being high, a set to be selected based at least in part on the priority level of the UCI being high and the priority level of the data on the PUSCH being low, and a set to be selected based at least in part on the priority level of the UCI being high and the priority level of the data on the PUSCH being high.

3. The UE of claim 1, wherein the plurality of sets of multiple beta offset factors includes a set to be selected based at least in part on the priority level of the UCI and the priority level of the data on the PUSCH being the same, a set to be selected based at least in part on the priority level of the UCI being low and the priority level of the data on the PUSCH being high, and a set to be selected based at least in part on the priority level of the UCI being high and the priority level of the data on the PUSCH being low.

4. The UE of claim 1, wherein the UE is configured for configured grant PUSCH, and wherein at least one of the priority level of the UCI or the priority level of the data on the PUSCH is configured by a radio resource control message.

5. The UE of claim 1, wherein the UE is configured for dynamic grant for hybrid automatic repeat request acknowledgement (HARQ-ACK) multiplexed on configured grant PUSCH, and wherein the priority level of the UCI is configured by downlink control information and the priority level of the data on the PUSCH is configured by a radio resource control message.

6. The UE of claim 1, wherein the UE is configured for persistent channel state information (CSI) feedback, and wherein at least one of the priority level of the UCI or the priority level of the data on the PUSCH is configured by a radio resource control message.

7. The UE of claim 1, wherein the one or more processors, when multiplexing the UCI with the data, are configured to set a spectrum efficiency of the UCI based at least in part on the beta offset factor.

8. The UE of claim 7, wherein the one or more processors, when setting the spectrum efficiency of the UCI based at least in part on the beta offset factor, are configured to set a quantity of resource elements that are to be used for the UCI when multiplexing the UCI with the data on the PUSCH.

9. A base station for wireless communication, comprising:
    one or more memories; and
    one or more processors, coupled to the one or more memories, configured to:
        determine a plurality of sets of multiple beta offset factors associated with multiplexing uplink control information (UCI) with data on a physical uplink shared channel (PUSCH);
        transmit configuration information associated with the plurality of sets of multiple beta offset factors to a user equipment (UE) such that the UE is configured to select, using a priority level of the UCI and a priority level of the data on the PUSCH, a beta offset factor from the plurality of sets of multiple beta offset factors for multiplexing the UCI with the data in an uplink communication on the PUSCH; and
        receive the uplink communication with the UCI and the data multiplexed on the PUSCH, wherein the UCI and the data are multiplexed based at least in part on the selected beta offset factor.

10. The base station of claim 9, wherein the plurality of sets of multiple beta offset factors includes a set to be selected based at least in part on the priority level of the UCI being low and the priority level of the data on the PUSCH being low, a set to be selected based at least in part on the priority level of the UCI being low and the priority level of the data on the PUSCH being high, a set to be selected based at least in part on the priority level of the UCI being high and the priority level of the data on the PUSCH being low, and a set to be selected based at least in part on the priority level of the UCI being high and the priority level of the data on the PUSCH being high.

11. The base station of claim 9, wherein the plurality of sets of multiple beta offset factors includes a set to be selected based at least in part on the priority level of the UCI and the priority level of the data on the PUSCH being the same, a set to be selected based at least in part on the priority level of the UCI being low and the priority level of the data on the PUSCH being high, and a set to be selected based at least in part on the priority level of the UCI being high and the priority level of the data on the PUSCH being low.

12. The base station of claim 9, wherein the UE is configured for configured grant PUSCH, and wherein the one or more processors are configured to transmit a radio resource control message that indicates at least one of the priority level of the UCI or the priority level of the data on the PUSCH.

13. The base station of claim 9, wherein the UE is configured for dynamic grant for hybrid automatic repeat request acknowledgement (HARQ-ACK) multiplexed on configured grant PUSCH, and wherein the one or more processors are configured to transmit downlink control information that indicates the priority level of the UCI and transmit a radio resource control message that indicates the priority level of the data on the PUSCH.

14. The base station of claim 9, wherein the UE is configured for persistent channel state information (CSI) feedback, and wherein the one or more processors are configured to transmit a radio resource control message that indicates at least one of the priority level of the UCI or the priority level of the data on the PUSCH.

15. A method of wireless communication performed by a user equipment (UE), comprising:
   selecting a set of multiple beta offset factors from a plurality of sets of multiple beta offset factors associated with multiplexing uplink control information (UCI) with data on a physical uplink shared channel (PUSCH),
      wherein the set of multiple beta offset factors is selected from the plurality of sets of multiple beta offset factors using a priority level of the UCI and a priority level of the data on the PUSCH;
   selecting a beta offset factor from the selected set of multiple beta offset factors according to a type of the UCI;
   multiplexing the UCI with the data in an uplink communication on the PUSCH based at least in part on the selected beta offset factor; and
   transmitting the uplink communication.

16. The method of claim 15, wherein the plurality of sets of multiple beta offset factors includes a set to be selected based at least in part on the priority level of the UCI being low and the priority level of the data on the PUSCH being low, a set to be selected based at least in part on the priority level of the UCI being low and the priority level of the data on the PUSCH being high, a set to be selected based at least in part on the priority level of the UCI being high and the priority level of the data on the PUSCH being low, and a set to be selected based at least in part on the priority level of the UCI being high and the priority level of the data on the PUSCH being high.

17. The method of claim 15, wherein the plurality of sets of multiple beta offset factors includes a set to be selected based at least in part on the priority level of the UCI and the priority level of the data on the PUSCH being the same, a set to be selected based at least in part on the priority level of the UCI being low and the priority level of the data on the PUSCH being high, and a set to be selected based at least in part on the priority level of the UCI being high and the priority level of the data on the PUSCH being low.

18. The method of claim 15, wherein selecting the beta offset factor from the selected set of multiple beta offset factors according to the type of the UCI includes selecting the beta offset factor from among a plurality of types of UCI, the plurality of types of UCI including: hybrid automatic repeat request acknowledgement (HARQ-ACK) that is 2 bits or less, HARQ-ACK that is from 3 bits to 11 bits, HARQ-ACK that is greater than 11 bits, channel state information (CSI) part 1 that is 11 bits or less, CSI part 1 that is greater than 11 bits, CSI part 2 that is 11 bits or less, and CSI part 2 that is greater than 11 bits.

19. The method of claim 15, wherein the UE is configured for configured grant PUSCH, and wherein at least one of the priority level of the UCI or the priority level of the data on the PUSCH is configured by a radio resource control message.

20. The method of claim 15, wherein the UE is configured for dynamic grant for hybrid automatic repeat request acknowledgement (HARQ-ACK) multiplexed on configured grant PUSCH, and wherein the priority level of the UCI is configured by downlink control information and the priority level of the data on the PUSCH is configured by a radio resource control message.

21. The method of claim 15, wherein the UE is configured for persistent channel state information (CSI) feedback, and wherein at least one of the priority level of the UCI or the priority level of the data on the PUSCH is configured by a radio resource control message.

22. The method of claim 15, wherein multiplexing the UCI with the data includes setting a spectrum efficiency of the UCI based at least in part on the beta offset factor.

23. The method of claim 22, wherein setting the spectrum efficiency of the UCI based at least in part on the beta offset factor includes setting a quantity of resource elements that are to be used for the UCI when multiplexing the UCI with the data on the PUSCH.

24. A method of wireless communication performed by a base station, comprising:
   determining a plurality of sets of multiple beta offset factors associated with multiplexing uplink control information (UCI) with data on a physical uplink shared channel (PUSCH);
   transmitting configuration information associated with the plurality of sets of multiple beta offset factors to a user equipment (UE) such that the UE is configured to select, using a priority level of the UCI and a priority level of the data on the PUSCH, a beta offset factor from the plurality of sets of multiple beta offset factors for multiplexing the UCI with the data in an uplink communication on the PUSCH; and
   receiving the uplink communication with the UCI and the data multiplexed on the PUSCH, wherein the UCI and the data are multiplexed based at least in part on the selected beta offset factor.

25. The method of claim 24, wherein the plurality of sets of multiple beta offset factors includes a set to be selected based at least in part on the priority level of the UCI being low and the priority level of the data on the PUSCH being low, a set to be selected based at least in part on the priority level of the UCI being low and the priority level of the data on the PUSCH being high, a set to be selected based at least in part on the priority level of the UCI being high and the priority level of the data on the PUSCH being low, and a set to be selected based at least in part on the priority level of the UCI being high and the priority level of the data on the PUSCH being high.

26. The method of claim 24, wherein the plurality of sets of multiple beta offset factors includes a set to be selected based at least in part on the priority level of the UCI and the priority level of the data on the PUSCH being the same, a set to be selected based at least in part on the priority level of the UCI being low and the priority level of the data on the PUSCH being high, and a set to be selected based at least in part on the priority level of the UCI being high and the priority level of the data on the PUSCH being low.

27. The method of claim 24, wherein each set of the plurality of sets of multiple beta offset factors includes beta offset factors for a plurality of types of UCI, the plurality of types of UCI including:
hybrid automatic repeat request acknowledgement (HARQ-ACK) that is 2 bits or less, HARQ-ACK that is from 3 bits to 11 bits, HARQ-ACK that is greater than 11 bits, channel state information (CSI) part 1 that is 11 bits or less, CSI part 1 that is greater than 11 bits, CSI part 2 that is 11 bits or less, and CSI part 2 that is greater than 11 bits.

28. The method of claim 24, wherein the UE is configured for configured grant PUSCH, and wherein the method further comprises transmitting a radio resource control.

29. The method of claim 24, wherein the UE is configured for dynamic grant for hybrid automatic repeat request acknowledgement (HARQ-ACK) multiplexed on configured grant PUSCH, and wherein the method further comprises transmitting downlink control information that indicates the priority level of the UCI and transmitting a radio resource control message that indicates the priority level of the data on the PUSCH.

30. The method of claim 24, wherein the UE is configured for persistent channel state information (CSI) feedback, and wherein the method further comprises transmitting a radio resource control message that indicates at least one of the priority level of the UCI or the priority level of the data on the PUSCH.

* * * * *